Feb. 27, 1962   D. J. BURKE   3,022,554
EXOTHERMIC MOLD HAVING DETACHABLE LOWER PORTIONS
Filed Dec. 7, 1959   3 Sheets-Sheet 2

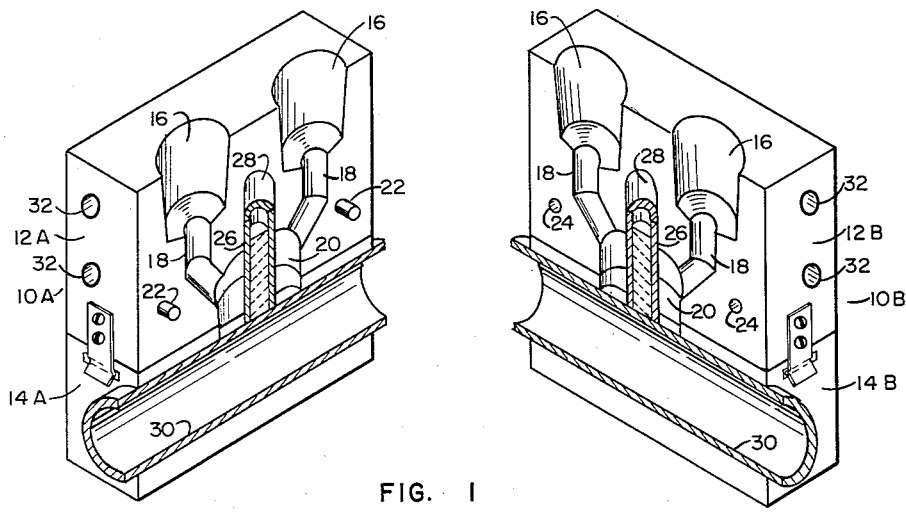
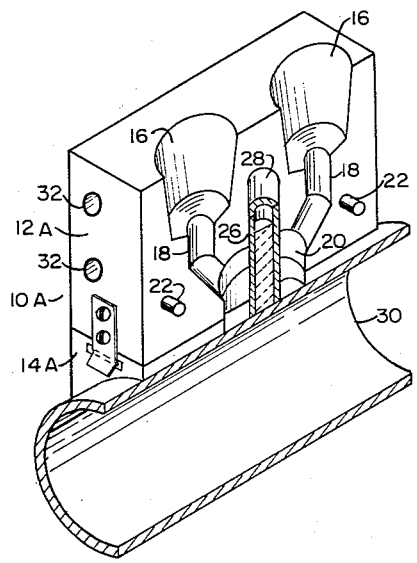

INVENTOR.
DONALD J. BURKE
BY
Paul H. Johnson
ATTORNEY

*INVENTOR.*
DONALD J. BURKE

United States Patent Office 3,022,554
Patented Feb. 27, 1962

3,022,554
EXOTHERMIC MOLD HAVING DETACHABLE
LOWER PORTIONS
Donald J. Burke, Tulsa, Okla., assignor to Continental
Industries, Inc., a corporation of Oklahoma
Filed Dec. 7, 1959, Ser. No. 857,913
4 Claims. (Cl. 22—116)

This invention relates to improvements in exothermic molds. More particularly, it relates to a novel means of adapting a single mold to be used in exothermically welding a tap to a variety of pipe sizes by providing detachable lower mold portions.

The exothermic welding of taps to pipes has proven to be economically feasible and has other advantages compared to the standard procedures of providing taps on pipes. However, an unnecessary expense has been encountered in the burden of providing a multitude of molds adapted to varying sizes of pipes. Exothermic molds consist essentially of a crucible cavity, a sprue cavity directing molten metal from the crucible cavity, and a weld cavity to receive the molten metal from the sprue cavity and apply it to the pipe and tap to be joined. The base area of the mold must have a configuration to closely fit the pipe to which the tap is to be welded so as to apply the molten weld metal in the proper disposition and prevent the molten weld metal from escaping away from the area to be welded. Presently, a totally new and complete mold is required for each application involving a different pipe size.

A crew of plumbers, welders, or pipe fitters, in order to equip themselves to make exothermic tap welds to all pipe sizes which they are likely to encounter are required to have on hand a complete mold for each possible pipe size. This naturally resulted in a great additional expense in the use of the exothermic process for welding taps to pipes.

The present invention contemplates a novel type exothermic mold. Broadly stated, the invention may be defined as an upper mold portion having a crucible cavity and a sprue cavity formed therein; a top cavity formed therein disposed to receive a tap and support it in proper position during the welding process; a detachable lower mold portion adaptable to engage said upper mold portion, said detachable lower mold portion having a weld cavity formed therein disposed to receive molten weld metal from said sprue cavity of said upper mold portion, said detachable lower mold portion having a pipe contact area adaptable to engage and substantially conform to a portion of a pipe to be welded; and means of supporting said upper mold portions to said detachable lower mold portions.

An object of this invention is to provide an exothermic mold adaptable to receive an interchangeable lower portion whereby said mold may be used to exothermically weld taps to a variety of sizes of pipes.

Another object of this invention is to provide means of supporting detachable lower portions to upper portions of exothermic molds.

Another object of this invention is to provide means of supporting detachable lower mold portions to upper mold portions of exothermic molds whereby said mold portions are supported in an immovable relationship with each other during the welding process.

Another object of this invention is to provide a mold for welding taps to pipes wherein said mold has a detachable lower portion and including means of aligning the detachable lower mold portion with the upper mold portion.

These and other objects and a better understanding of this invention may be had by referring to the following description and claims taken in conjunction with the attached drawings in which:

FIGURE 1 is an isometric view of a bifurcated exothermic mold showing each mold half supporting a tap to be welded to a pipe.

FIGURE 2 is an isometric view of one-half of a bifurcated exothermic mold affixed to a larger pipe.

Figure 3:
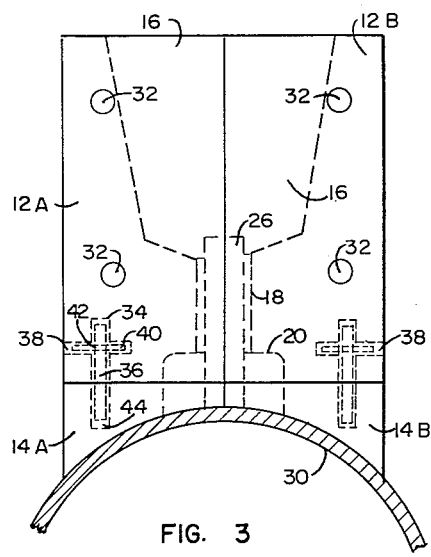
FIGURE 3 is an end view of an exothermic mold positioned on a pipe for welding and showing a means whereby dowel pins are provided to align the upper and lower portion of said molds in an immovable relationship during the welding process.

The method of exothermically welding a tap to a pipe is fully described in my co-pending application entitled: Process for Exothermically Welding Pipe, filed July 17, 1959, Serial Number 827,831, now Patent 2,990,593, issued July 4, 1961. Briefly stated, the process involves positioning the first half of a bifurcated mold on a pipe to which the tap is to be welded, placing the tap in the proper position on the pipe, placing the other half of the bifurcated mold in contact with the first half of the mold whereby close engagement is provided around the pipe to which the tap is to be welded and with the tap supported within the mold, filling a crucible formed in the mold with an exothermic reaction mixture, firing the mixture whereby a molten weld metal is released which flows into a weld cavity surrounding the pipe tap wherein the weld cavity is defined in part by a portion of the pipe to which the tap is to be welded, whereby the tap is welded, and securely joined to the pipe, by the deposit of molten weld metal. This process has many advantages over other means of providing a tap to a pipe. One important advantage is that a tap may be applied to a pipe without disconnecting the pipe from the service in which it is used.

However, one disadvantage which has limited the use of this method is the requirement of a complete mold for each different pipe size, and therefore each crew of workmen using the exothermic welding process must have on hand a multitude of complete molds. To eliminate this burden, this invention, looking first at FIGURE 1, provides a mold 10 composed of a first half 10A and second half 10B. Both mold halves 10A and 10B have been divided into an upper portion 12A and 12B and a lower portion 14A and 14B. It should be noted that when mold half 10A and 10B are joined together, crucible cavities 16 are formed, adaptable for receiving the exothermic reaction mixture. Sprue cavities 18 direct the molten weld metal produced in crucibles 16 into a weld cavity 20. Pins 22 in mold half 10A project to coincide with holes 24 in mold half 10B so that when mold halves 10A and 10B are placed together, they are supported and held firmly in position with each other.

Tap 26 is positioned within tap cavity 28 to engage pipe 30 to which the tap is to be welded.

An important element of this invention is that both mold halves 10A and 10B have been divided into upper portions 12A and 12B and lower portions 14A and 14B. It can be seen that the upper mold portions 12A and 12B are not required to be varied with each change in the size of pipe 30. The crucibles 16, sprue cavities 18 and tap cavity 28 have the same dimensional requirements regardless of the size of pipe 30. One of the essential novel elements of this invention is the provision of an exothermic mold 10 formed with upper and detachable lower portions whereby a multitude of detachable lower portions may be adapted to a uniform upper portion to facilitate the use of a single upper mold portion to weld taps to a multitude of sizes of pipe.

FIGURE 2 shows mold half 10A with the same configuration of upper portion 12A as shown in FIGURE 1. However, a much larger pipe 30 is shown, to which tap 26 is to be welded by the provision of a detachable lower portion 14A which is of a different geometric configuration than the detachable lower portion 14A of FIGURE 1.

Exothermic molds 10 are composed of a refractory material which will withstand the exceedingly high temperatures generated by the exothermic reaction without deterioration. Grafite has proven to be a good refractory material for use in constructing exothermic molds 10. It can be seen that in an exothermic mold 10 of the type necessary for welding taps 20 to pipes 30, most of the machining of openings and cavities occurs in the upper mold portion 12A and 12B. Within the upper portion 12A and 12B is contained the crucible cavities 16, the sprue cavities 18, the tap cavity 28, and most of the weld cavity 20. Therefore, most of the expense of manufacturing a mold 10 is contained in the upper portion 12A and 12B which is substantially identical for different size of pipe 30 applications. By providing lower portions 14A and 14B which are detachable and interchangeable with upper portions 12A and 12B, the expense of providing molds adapted to welding taps 26 to a variety of sizes of pipe 30 can be materially reduced. The mold 10 may be distributed in a package form composed of upper portion 12A and 12B with a multitude of detachable lower portions 14A and 14B adapted to facilitate the welding of taps 26 to a variety of sizes of pipes 30.

Clamp holes 32 are provided in the ends of upper portions 12A and 12B whereby the prongs of a clamp (not shown) may be inserted to facilitate holding the two halves 12A and 12B of the mold in position during the welding process.

The detachable lower mold portion 14A and 14B must be aligned to the upper mold portions 12A and 12B in a firm and immovable relation with each other during the welding process.

FIGURE 3 indicates a method of providing a means of supporting the detachable lower portions 14A and 14B in an aligned relationship with upper mold portions 12A and 12B. A hole 34 is drilled in the upper portion 12A. A dowel pin 36 is inserted into hole 34 so that a portion of the dowel pin 36 protrudes beyond upper mold portion 12A. A retaining hole 38 is drilled in upper mold portion 12A perpendicular to the hole 34 so as to intersect hole 34. A retaining pin 40 is inserted into retaining hole 38 to engage dowel pin 36 and to protrude through a small opening 42 in dowel pin 36 whereby the dowel pin 36 is secured in the upper mold portion 12A. A hole 44 is drilled in lower mold portion 14A to receive the protruding dowel pin 36.

Although only one dowel pin 36 is shown in FIGURE 3, in practice at least two of such dowel pins 36 are provided for each upper mold portion 12A and 12B.

Figure 13:
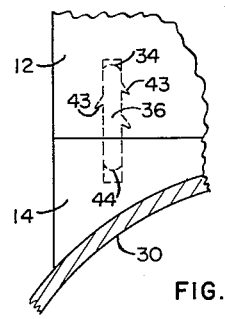
FIGURE 13 is an end view of a portion of a mold positioned on a pipe showing the use of a barbed dowel pin as a means of aligning the detachable lower mold portion with the upper mold portion.

Another means of aligning the detachable lower mold portion 14 with the upper mold portion 12 is shown in FIGURE 13. A hole 34 is drilled into upper mold portion 12. A dowel pin 36 having integrally formed barbs 43 protruding from the surface thereof is driven into hole 34. The barbs 43 retain dowel pin 36 within upper mold portion 12. The detachable lower mold portion 14 has a hole 44 drilled therein to receive the dowel pin 36 protruding from the upper mold portion so as to preserve the upper and detachable lower mold portions 12 and 14 in proper alignment.

Figure 6:
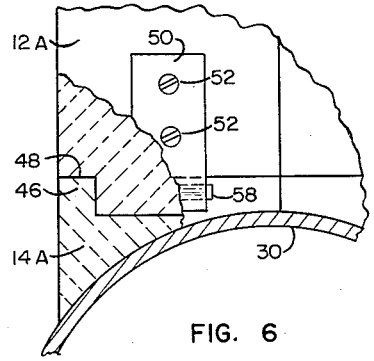
FIGURE 6 is an end view of a portion of an exothermic mold of this invention positioned on a pipe and wherein the mold is shown partly in cross-section to disclose a dove-tail arrangement whereby the upper and detachable lower portions of the mold may be aligned in an immovable relationship during the welding process.

A different method of supporting upper mold portions 12 and detachable lower mold portions 14 in an aligned relationship is shown in FIGURE 6. In this method, detachable lower mold portion 14A is provided with an integrally formed extending lip 46, which engages a recessed area 48 in upper mold portion 12A. The extended lip portion 46 with recessed area 48 forms a dovetail type fit between upper mold portion 12A and detachable lower mold portion 14A so that they are held in a firm alignment with each other while the mold 10 is in use.

It is apparent that the dove-tail arrangement of FIGURE 6 may be altered in innumerable ways. For instance, the lip portion 46 may be made a part of upper mold portion 12A and the recessed area 48 may be made a part of the detachable lower mold portion 14A. Other means of supporting upper mold portion 12A and detachable lower mold portion 14A in an aligned relationship with each other will readily suggest themselves, such as providing protruding areas (not shown) equivalent to the dowel pin 36 of FIGURE 3, which are integrally formed with upper mold portion 12A to engage hole 44 in lower portion 14A.

Figure 4:
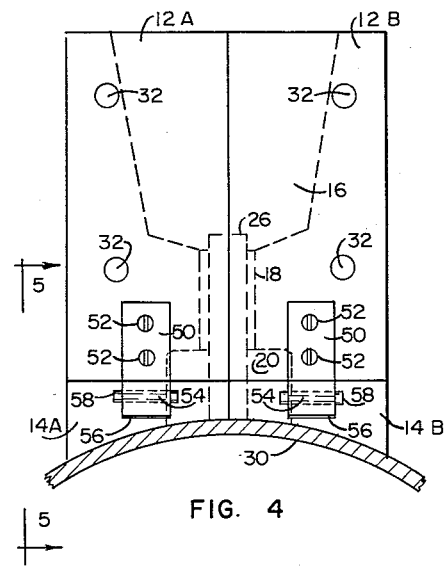
FIGURE 4 is an end view of an exothermic mold showing clip means used to support the detachable lower mold portion to the upper mold portion.
Figure 5:
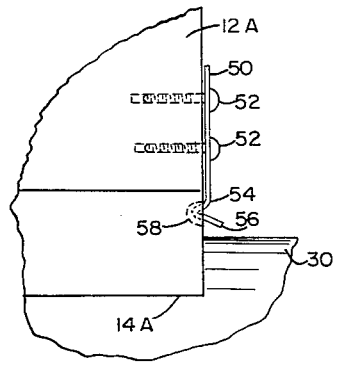
FIGURE 5 is a side view of a portion of an exothermic mold positioned on a pipe taken along the line 5—5 of FIGURE 4 showing means whereby clips are used to support the upper and detachable lower portions of the mold together during the welding process.

With the means of supporting the upper and detachable lower mold portions 12A and 14A in an aligned relationship with each other, a welding operation may be consummated by positioning detachable lower mold portions 14A and 14B on the pipe 30 to be welded and then positioning upper mold portions 12A and 12B in contact with detachable lower portions 14A and 14B and supporting the upper portion 12A and 12B together, as with a clamp means described previously. However, to facilitate quicker positioning of the mold 10 onto pipes 30 to be welded it is advantageous to provide means whereby the detachable lower mold portions 14A and 14B are removably affixed to upper mold portion 12A and 12B. One means of accomplishing this is indicated in FIGURE 4 and FIGURE 5. Spring clips 50 are secured to upper mold portions 12A and 12B with screws 52. Spring clips 50 are provided with angular portions 54, best shown in FIGURE 5, and protruding portions 56. Detachable lower mold portions 14A and 14B are provided with rectangular shaped recess area 58. The angular portions 54 of spring clips 50 engage recess areas 58 whereby the upper mold portions 12 is supported to the detachable lower mold portions 14. Protruding portions 56 of spring clip 50 provide a means for manually disengaging the angular portions 54 from the recess areas 58 of the detachable lower mold portions 14A and 14B to provide means for readily changing the detachable lower mold portions 14A and 14B to fit upper mold portions 12A and 12B when welding is to be performed on a different size of pipe 30.

Figure 7:
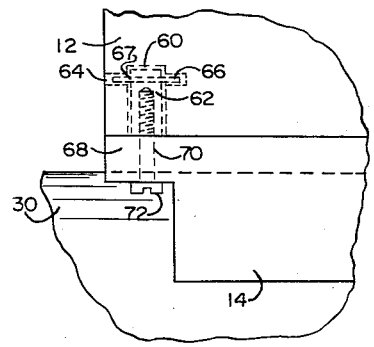
FIGURE 7 is a side view of a portion of a mold positioned on a pipe showing a means whereby the detachable lower mold portion may be supported to the upper mold portion utilizing a tapped insert.
Figure 8:
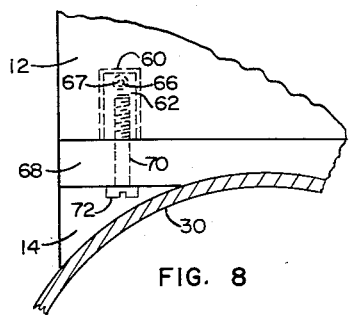
FIGURE 8 is an end view of a portion of a mold positioned on a pipe showing a means whereby the upper and detachable lower portions of the mold may be supported to each other utilizing a tapped insert.

Another means of affixing detachable lower mold portions 14A and 14B to upper mold portions 12A and 12B is shown in FIGURE 7 and FIGURE 8. A hole 60 is drilled in upper mold portion 12 and a tapped insert 62 is inserted in hole 60. A retaining hole 64 is drilled at right angles to hole 60 and a retaining pin 66 is inserted thereby into hole 67 drilled in the taped inserts 62 to support the taped inserts 62 in the upper mold portion 12B. Detachable lower mold portion 14 is formed with an extending lip 68. Into extending lip 68 a hole 70 is drilled and a bolt 72 is placed therein to engage the tap insert 62 to support the detachable lower mold portion 14 to the upper mold portion 12. Although only one taped insert 62 is shown, at least two are provided for each detachable lower mold portion 14A and 14B so that detachable lower mold portion 14A and 14B are firmly supported to the upper mold portions 12A and 12B.

Figure 9:
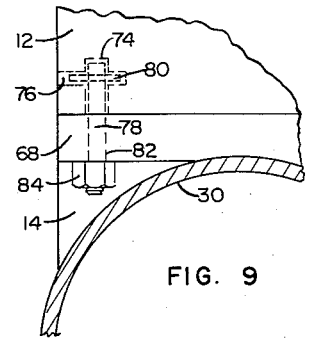
FIGURE 9 is an end view of a portion of a mold positioned on a pipe showing a means whereby the upper and detachable lower portions of the mold may be supported together using a stud and nut means.

A different means of supporting the upper and detachable lower mold portions 12 and 14 together is shown in FIGURE 9. A hole 74 is drilled in upper mold portion 12 with a retaining hole 76 drilled perpendicular to it so as to intersect hole 74. A stud 78 is inserted in hole 74 and held there by a retaining pin 80. Stud 78 protrudes through an opening 82 in lip 68 of detachable lower mold portion 14. A nut 84 disengages stud 78 to support the upper and lower portions 12 and 14 of the mold 10 together.

Figure 10:
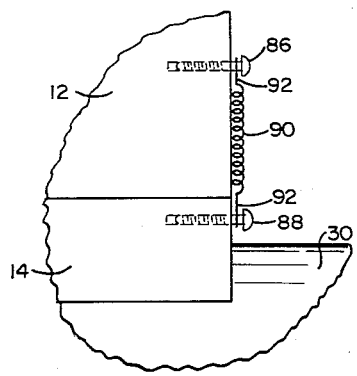
FIGURE 10 is a side view of a portion of a mold positioned on a pipe showing a spring means whereby the detachable lower mold portion is supported to the upper mold portion.
Figure 11:
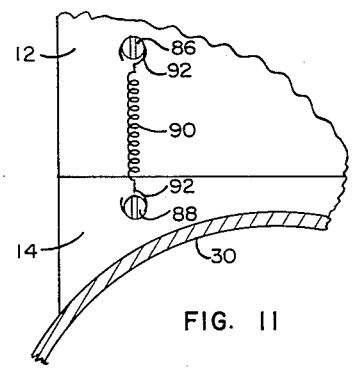
FIGURE 11 is an end view of a portion of a mold positioned on a pipe showing a spring means whereby the detachable lower mold portion is supported to the upper mold portion.

An additional example of the means whereby the upper and detachable lower mold portions 12 and 14 may be supported together is shown in FIGURES 10 and 11. A screw 86 is placed in upper mold portion 12 and a similar screw 88 is placed in detachable lower mold portion 14. A spring 90, having hooks 92 formed on each end, is stretched between the screws 86 and 88 to support the mold halves 12 and 14 together. Spring hooks 92 may be closed upon screw 86 so that when the mold portions 12 and 14 are disassembled, springs 90 will not become unloosened from screws 86 and be lost.

Figure 12:
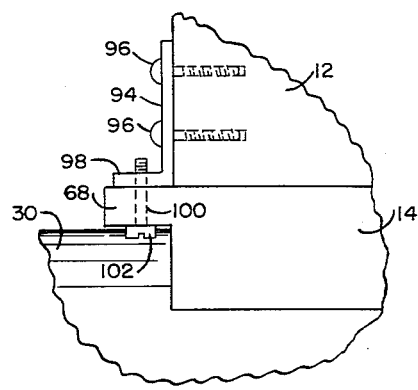
FIGURE 12 is a side view of a portion of a mold showing an angular clip means whereby the detachable lower mold portion is supported to the upper mold portion.

Another means of supporting the detachable lower mold portion 14 in engagement with upper mold portion 12 is shown in FIGURE 12. An angular clip 94 is affixed to upper mold portion 12 by screws 96. The angular clip 94 has a threaded opening 98 drilled and tapped therein. The detachable lower mold portion 14 has an integrally formed protruding lip portion 68 having a hole 100 drilled therein. A threaded bolt 102 extends through hole 100 and threadably engages threaded opening 98 of angular clip 94 to support the detachable lower mold portion 14 to the upper mold portion 12.

Many other means of supporting the detachable lower portions 14 with the upper mold portions 12 will suggest themselves. The means indicated in this disclosure are by way of example only and to point out specific embodiments of the principles of the invention.

Although a mold 10 having two crucible cavities 16 is shown, the principle of this invention is equally applicable to molds having one or any number of crucible cavities 16. Also, the adaptation of the mold 10 for use in welding taps to pipe is by way of example only and the invention may be adapted to welding together an unlimited number of metallic elements having different configurations.

It is manifest that many changes may be made in the details of construction of the devices shown herein in that this invention has been described with a certain degree of particularity. However, the changes and alterations which suggest themselves do not depart from the scope and intent of this disclosure.

I claim:
1. A mold for exothermically welding a tap to a pipe comprising, an upper mold portion having at least one crucible cavity formed therein, at least one sprue cavity formed therein, a tap cavity formed therein disposed to receive and support said tap, and an upper portion of a weld cavity formed therein; a detachable lower mold portion having a lower portion of a weld cavity formed therein disposed to align with said upper portion of said weld cavity in said upper mold portion, said detachable lower mold portion disposed to conform to external circumference of said pipe to which said tap is to be welded, and means of supporting said detachable lower mold portion to said upper mold portion.

2. A mold according to claim 1 wherein said upper mold portion is bifurcated and wherein said detachable lower mold portion is bifurcated and wherein each of said bifurcated portions of said detachable lower mold portion is supported to a bifurcated portion of said upper mold portion.

3. A mold for exothermically welding a tap to a pipe comprising, an upper mold portion; a detachable lower mold portion disposed to conform to a portion of the external circumference of said pipe to which said tap is to be welded and wherein said upper mold portion and said detachable lower mold portions when supported together have formed therein at least one crucible cavity, at least one sprue cavity, and a weld cavity connected to said crucible cavity by said sprue cavity and a tap cavity disposed to receive said tap and support said tap in position within said weld cavity and in engagement with said pipe and wherein said detachable lower portion of said mold is disengageable whereby said upper portion of said mold may be used with a variety of detachable lower portions of said mold whereby said upper portion of said mold may be used to weld taps to a variety of sizes of said pipes.

4. A claim according to claim 3 wherein said upper portion of said mold is bifurcated and wherein said detachable lower portion of said mold is bifurcated and wherein each of said detachable lower portions of said bifurcated mold is supported to one of said bifurcated portions of said upper mold.

References Cited in the file of this patent

UNITED STATES PATENTS

| | | |
|---|---|---|
| 1,083,841 | Le Blanc | Jan. 6, 1914 |
| 1,168,062 | Deppeler | Jan. 11, 1916 |
| 1,920,578 | Matzow | Aug. 1, 1933 |
| 2,051,653 | Rich | Aug. 18, 1936 |
| 2,416,863 | Begtrup | Mar. 4, 1947 |
| 2,664,606 | Di Chiara | Jan. 5, 1954 |